Sept. 6, 1949.  C. K. COX  2,480,906
HOSE SUPPORT AND CLAMP
Filed June 23, 1947
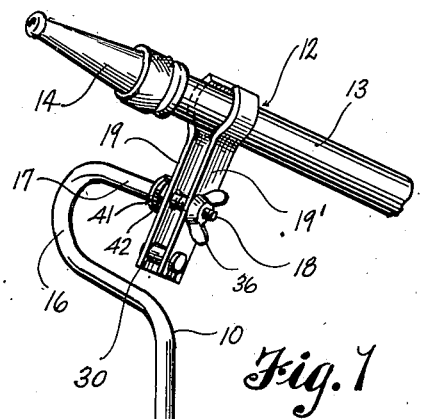
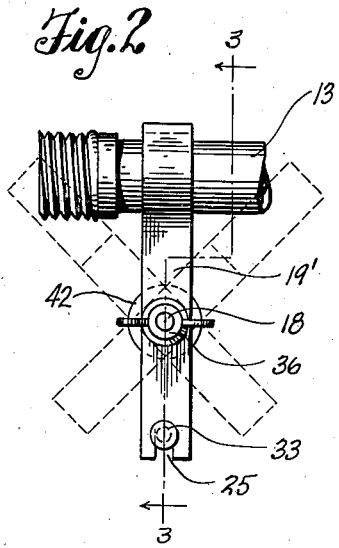
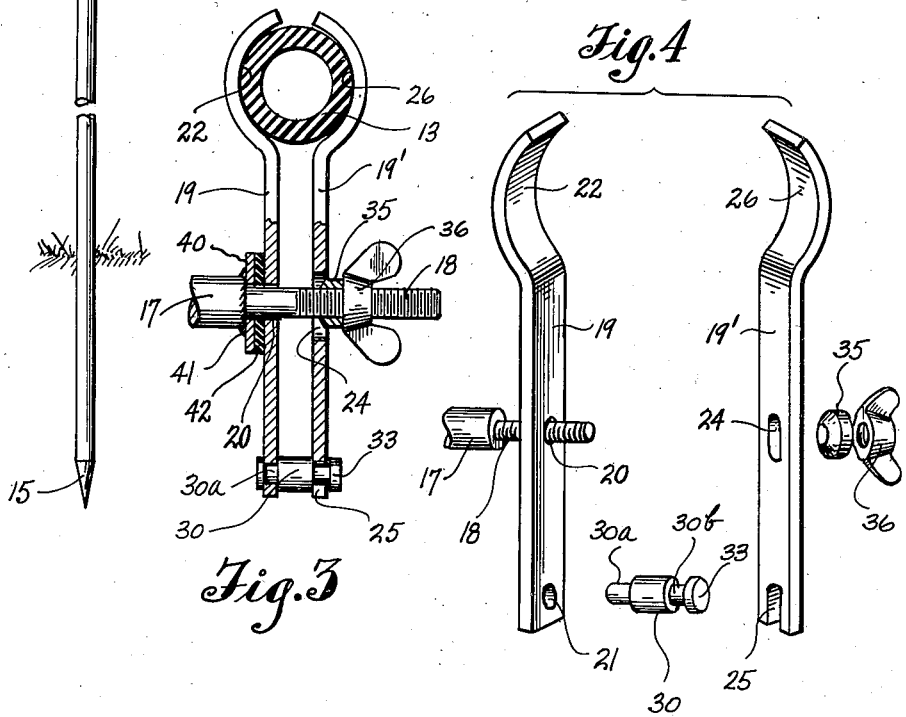
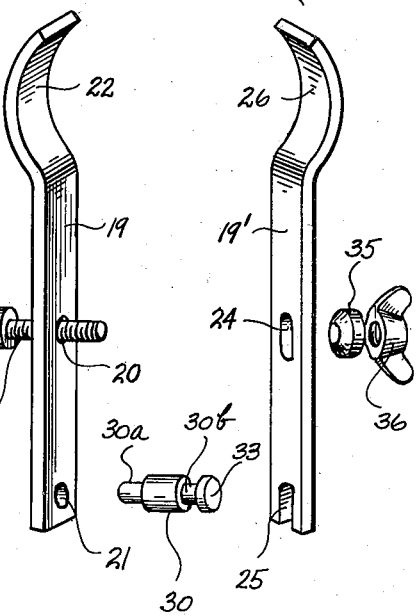
INVENTOR.
CLIFFORD K. COX
BY
Cook & Robinson
ATTORNEYS Patented Sept. 6, 1949

2,480,906

UNITED STATES PATENT OFFICE 2,480,906

HOSE SUPPORT AND CLAMP

Clifford K. Cox, Kent, Wash.

Application June 23, 1947, Serial No. 756,508

5 Claims. (Cl. 248—88)

This invention relates to hose supports and clamps. More particularly, it has reference to novel means for holding a hose for lawn sprinkling and similar watering purposes; it being the principal object of the invention to provide a hose supporting spike or standard that may be pressed into the ground and on the upper end of which a clamp is mounted whereby a garden hose may be held at a desired or required position for sprinkling or watering.

More specifically stated, it is the object of my invention to provide an improved form of hose support and clamp combination; the clamp being mounted for rotation on the support about a horizontal axis, and adapted to be secured at any angle of rotary adjustment. Furthermore, it is an object of the invention to provide a support and clamp combination as above stated wherein the same means used for securing the clamp at a set position of adjustment will also serve to secure the clamp against the hose.

Still further objects of the invention reside in the combination of clamp and standard; in the details of construction and functional relationship of parts and in the mode of use of the device, as will hereinafter be fully described.

In accomplishing the above mentioned and other objects of the invention, I have provided the improved details of construction, the preferred forms of which are illustrated in the accompanying drawings, wherein—

Fig. 1 is a perspective view of a hose clamp and support embodied by the present invention, showing the combination as used for supporting a hose for sprinkling purposes.

Fig. 2 is a side view of a part of the device, indicating the manner in which the clamp may be rotatably adjusted on the support.

Fig. 3 is a sectional view taken on line 3—3 in Fig. 2.

Fig. 4 is a perspective view of the parts of the clamp in disassembled relationship.

Referring more in detail to the drawings—

The present device comprises a supporting spike or standard designated in its entirety by numeral 10, and a clamp which, in Fig. 1, is designated in its entirety by reference numeral 12. The clamp is designed to support a hose which is designated by reference numeral 13 and which is shown as equipped with a nozzle 14.

The standard or support 10 is preferably made from a round rod, sharpened at its lower end as at 15 to facilitate its being pressed into the ground. At its upper end, the rod is bent in such manner as to provide a partial loop 16 and a horizontal handle portion 17 which terminates in a threaded portion 18 of reduced diameter, on which the hose holding clamp is mounted as will be well understood by reference to Fig. 3.

The clamp 12 comprises two complemental clamp levers 19 and 19' of substantially the same size and made up of flat strips of metal. The lever 19 is formed at a location approximately midway of its ends, with a hole 20 whereby it may be rotatably mounted on the reduced end portion 18 of the standard portion 17. At one end it has a hole 21 designed to receive one end of a rivet whereby the ends of the levers are joined, as presently described, and at its other end is curved to provide a rounded seat 22 for engaging against one side of the hose 13 when it is mounted between the clamp levers as in Fig. 1.

The clamp lever 19' is formed at its medial point with a longitudinal slot 24 corresponding to the hole 20 of lever 19, and adapted to receive the mounting portion 18 of the part 17 of the supporting spike. At one end it has a slot 25 opening to the end of the lever, and at its other end is curved to form a seat 26 that is opposedly related to the seat 22 when the clamp levers are functionally assembled.

The rivet whereby the ends of the clamp levers are operatively joined is designated by numeral 30. It is formed at one end with a reduced portion 30a that may be passed through the hole 21 of the lever 19 and solidly riveted therein. At its other end, the rivet has a diametrically reduced portion 30b terminating in a head 33. The part 30b may be received in the slot 25 of lever 19' as observed in Fig. 3.

To assemble the parts of the clamp, the lever 19 is first applied to the standard 10 by passing the reduced end portion 18 of the standard through the hole 21 of lever 19. Then that end of the lever 19' formed with the notch or slot 25 is applied to the rivet neck 30b and is held by the rivet head 33, while the reduced end portion 18 of the horizontal portion 17 of the spike is applied through the opening 24 and a washer 35 and wing nut 36 are then threaded onto the part 18 to retain the assembly. The hose 13 is placed between the levers 19 and 19' at the open end of the clamp and is held in the seats 22 and 26 thereof by the tightening of the wing nut.

A feature of the invention resides in the friction means for holding the clamp at a set position relative to the support, which means will now be described.

Seated about the reduced portion 18 of the horizontal arm 17 of the support and against the shoulder at the base of the reduced portion, is a washer 40. This is welded as at 41 or otherwise secured on the rod against turning. Disposed between the clamp lever 19 and washer 40 is a rubber friction disk or washer 42, against which the lever firmly engages.

It will be understood that with the tightening of the wing nut, the levers 19 and 19' will be drawn together and thus caused to firmly grip the hose and also, the lever 19 will be clamped tightly against the rubber washer 42 and, due to friction produced, the clamp will be held against turning on the support.

The procedure is first to adjust the clamp to the desired angle and then to tighten the wing nut, both to clamp the hose and to hold the clamp at the set position. The spike may be pressed into the ground and turned to a desired direction for discharge of the spray from the hose.

Such devices may be made in various sizes and of various materials, and will effectively and satisfactorily serve their purpose.

Having thus described my invention, what I claim as new therein and desire to secure by Letters Patent, is:

1. A hose support of the character described comprising a standard adapted for insertion at one end into the ground for its support, and having a threaded shank at its upper end, a hose clamp mounted on said shank, comprising a pair of coextensive levers, each with a hole at a medial point, whereby they are mounted to turn freely on the said shank, and each being formed at one end with a seat coacting with the seat of the other lever to retain a hose between them, fulcrum means joining the other ends of the levers in fixed spacing, and a wing nut threaded onto the shank for drawing the levers together and to clamp them against the hose.

2. A hose support as recited in claim 1 wherein an abutment washer is fixed on the shank at that side of the clamp opposite the nut, and a friction member is disposed between said washer and adjacent clamp lever as a means of resisting rotation of the clamp about the shank.

3. A hose support of the character described comprising a standard adapted for insertion into the ground at one end for its support, and having a laterally turned upper end portion terminating in a shank of reduced diameter, an abutment washer fixed on the shank at the base thereof, a hose clamp mounted on said shank and comprising a pair of coextensive, complemental levers, each with a hole therein medially of its ends to freely contain said shank for rotation of the clamp thereabout, and having seats formed at corresponding ends to receive a garden hose between them, and a rivet joining said levers in fixed spacing at their other ends, a friction washer disposed about the shank between the abutment washer and adjacent clamp lever and a wing nut threaded onto the shank to press the clamp against the friction washer to resist its rotating on the shank.

4. A hose support as recited in claim 3 wherein one lever is releasably connected at one end to said rivet that spaces and joins the levers, and the opening therein that receives said shank is elongated in the direction of the lever to permit its disconnection from the rivet.

5. In a device of the character described, a hose clamp comprising a pair of complemental coextensive levers, provided at corresponding ends with seats to receive a hose therein between the levers, and a spacing member joining the levers at their other ends for a hinge-like clamping action against the hose; said levers having holes through their medial portions, a supporting shank extended through said holes, a base washer fixed on the shank at one side of the clamp, a nut threaded onto the shank at the other side of the clamp and adapted for drawing the levers together, and a friction disk disposed between the clamp and base washer.

CLIFFORD K. COX.

REFERENCES CITED

The following references are of record in the file of this patent:

UNITED STATES PATENTS

| Number | Name | Date |
|---|---|---|
| 471,156 | Tinsley | Mar. 22, 1892 |
| 982,597 | Habig | Jan. 24, 1911 |
| 1,085,084 | Haines | Jan. 20, 1914 |
| 1,267,305 | Balcom | May 21, 1918 |
| 1,393,098 | Eastman | Oct. 11, 1921 |